United States Patent
Kasamatsu (10) Patent No.: US 7,889,768 B2
(45) Date of Patent: Feb. 15, 2011

(54) MODE-LOCKED SOLID-STATE LASER APPARATUS

(75) Inventor: Tadashi Kasamatsu, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 101 days.

(21) Appl. No.: 12/246,296

(22) Filed: Oct. 6, 2008

(65) Prior Publication Data

US 2009/0116516 A1    May 7, 2009

Related U.S. Application Data

(63) Continuation of application No. 12/240,279, filed on Sep. 29, 2008.

(30) Foreign Application Priority Data

Sep. 28, 2007  (JP) .............................. 2007-254219
Sep. 28, 2007  (JP) .............................. 2007-254220

(51) Int. Cl.
   H01S 3/08   (2006.01)
   H01S 3/092  (2006.01)
   H01S 3/098  (2006.01)
   H01S 3/091  (2006.01)
(52) U.S. Cl. ................ 372/18; 372/98; 372/70
(58) Field of Classification Search ................ 372/18, 372/98, 70, 72
See application file for complete search history.

(56) References Cited

U.S. PATENT DOCUMENTS

| 6,307,872 | B1 | 10/2001 | Tomaru et al. |
| 7,106,764 | B1 | 9/2006 | Weingarten et al. |
| 2003/0002544 | A1* | 1/2003 | Peterson ...................... 372/10 |
| 2007/0297464 | A1* | 12/2007 | Adachi et al. ................. 372/18 |

FOREIGN PATENT DOCUMENTS

| EP | 1 870 972 A1 | 12/2007 |
| JP | 03-209783 | 9/1991 |
| JP | 11-168252 | 6/1999 |

OTHER PUBLICATIONS

Brunner et al., "Diode-pumped femtosecond Yb:KGd(WO$_4$)$_2$ laser with 1.1-W average power," Optics Letters, Aug. 1, 2000, vol. 25, No. 15, pp. 1119-1121.

(Continued)

*Primary Examiner*—Minsun Harvey
*Assistant Examiner*—Patrick Stafford
(74) *Attorney, Agent, or Firm*—Sughrue Mion, PLLC (57) ABSTRACT

A mode-locked solid-state laser apparatus having a resonator which includes a solid-state laser medium, a saturable absorption mirror, and a negative group dispersion element therein, in which the solid-state laser medium and the saturable absorption mirror are disposed at a distance not greater than twice a Rayleigh length which is determined by the beam radius of oscillation light formed at the saturable absorption mirror. The apparatus further includes a dichroic mirror in the resonator that reflects excitation light inputted from a direction crossing the optical axis of the resonator toward the solid-state laser medium and transmits oscillation light.

8 Claims, 8 Drawing Sheets

OTHER PUBLICATIONS

Taira et al., "Modeling of quasi-three-level lasers and operation of cw Yb:YAG lasers," Applied Optics, Mar. 20, 1997, vol. 36, No. 9, pp. 1867-1874.

Hönninger et al., "Q-switching stability limits of continuous-wave passive mode locking," Journal of the Optical Society of America B, Jan. 1999, vol. 16, No. 1, pp. 46-56.

EP Communication, dated Oct. 27, 2009, issued in corresponding EP Application No. 08017014.5, 10 pages.

Jacobson et al., "Femtosecond pulse generation in a Ti:$Al_2O_3$ laser by using second- and third-order intracavity dispersion," Optics Letters, vol. 17, No. 22, Nov. 15, 1992, pp. 1608-1610.

EP Communication, dated Oct. 22, 2009, issued in corresponding EP Application No. 08017015.2, 8 pages.

Krainer et al., "77 GHz soliton modelocked Nd:$YVO_4$ laser," Electronics Letters, vol. 36, No. 22, Oct. 26, 2000, 2 pages, XP-006015843.

* cited by examiner

MODE-LOCKED SOLID-STATE LASER APPARATUS

This is a continuation application of application Ser. No. 12/240,279, filed Sep. 29, 2008.

BACKGROUND OF THE INVENTION

1. Field of the Invention

The present invention relates to a solid-state laser apparatus, and more specifically to a small soliton mode-locked solid-state laser apparatus capable of short-pulse operation.

2. Description of the Related Art

Solid-state lasers in which a semiconductor laser (LD) is used as the excitation light source and a solid-state laser medium (laser crystal, ceramics, glass, or the like) doped with rare earth ions or transition metal ions is excited by the light source have been actively developed. Among them, short pulse lasers that generate so-called short pulse beams in the range from picoseconds to femtoseconds have been sought and proposed in many application fields including medicine, biology, machine industry, and measurement, and some of them are put into practical use after demonstration.

This type of laser apparatus generates short pulses by so-called mode locking. To put it briefly, the mode locking is a phenomenon in laser oscillation where all phases of multi-longitudinal modes are locked (relative phase difference=0) in the frequency domain, and the pulses become extremely short in the time domain due to multimode interference between longitudinal modes. In the field of solid-state laser apparatuses, mode locking by semiconductor saturable absorbing mirror (SESAM) has been actively developed since it is simple, low cost, small, and self initiating.

Particularly, in soliton mode locking, which is one of the CW mode locking regimes, the combination of negative group velocity dispersion in the laser resonator and self phase modulation mainly in the laser medium enables generation of pulses in the femtosecond region. More specifically, the soliton mode locking is a regime in which mode locking is initiated and the pulses are maintained/stabilized by the semiconductor saturable absorbing mirror, at the same time the mode locked pulses become sharp through soliton pulse forming which occurs by balancing the negative group velocity dispersion with self phase modulation, thereby stable pulse generation becomes possible (Optics Letters, vol. 25, No. 15, pp. 1119-1121, 2000 (Non-Patent Document 1), and Journal of Optical Society of America, vol. 16, No. 1, pp. 46-56, 1999 (Non-Patent Document 3).

Basically, a solid-state laser apparatus that realizes the soliton mode locking includes a solid-state laser medium, a saturable absorbing mirror, and a negative group velocity dispersion element within the resonator. In the following, the negative group velocity dispersion is also simply referred to as negative dispersion.

Figure 17:
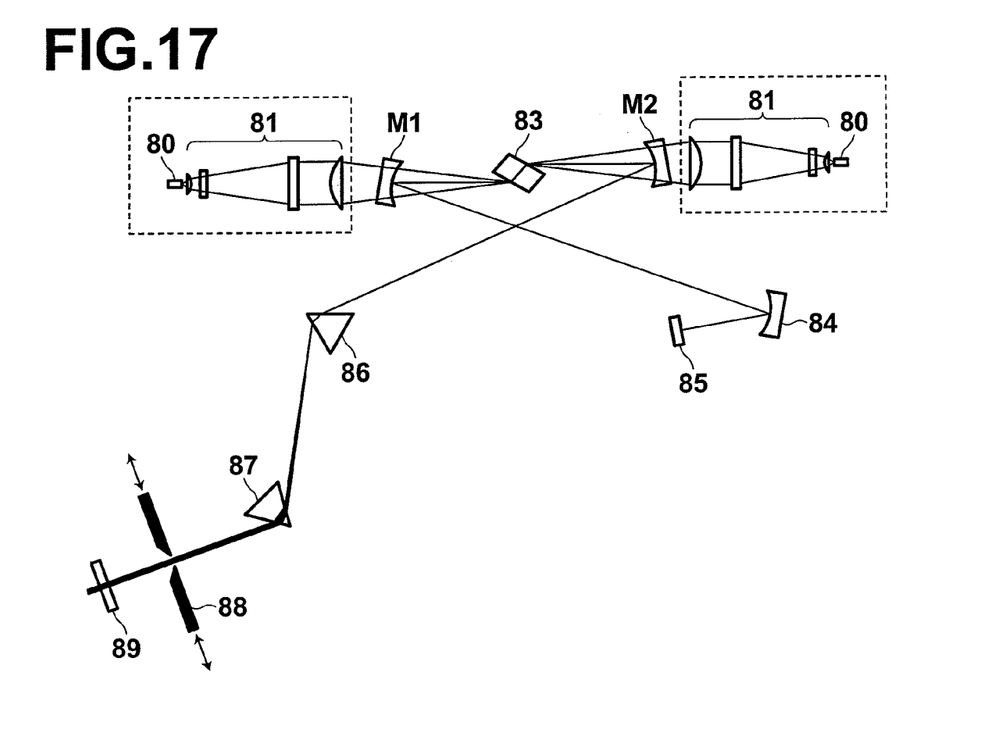
FIG. 17 is a schematic plan view of an example conventional mode-locked solid-state laser apparatus.

A typical configuration of a conventional soliton mode-locked solid-state laser doped with Yb (solid-state laser medium is Yb:KGd(WO$_4$)$_2$) as described in Non-Patent Document 1 is shown in FIG. 17. In the drawing, the reference symbol 80 is an excitation light source that emits, for example, 980 nm excitation light, 81 is an input optical system provided for each of a pair of the excitation light sources 80, 83 is a solid-state laser medium, M1 and M2 are a pair of concave mirrors forming a resonator with a curvature radius of, for example, 20 cm, 84 is a concave mirror with a curvature radius of 20 cm, 85 is a SESAM, 86 and 87 are prisms forming a prism pair made of, for example, SF10 glass, 88 is a knife edge plate, and 89 is an output coupler with a transmittance of, for example, 4.3%.

As illustrated in FIG. 17, the conventional apparatus employs a configuration in which the beam radius of the laser oscillation light is focused separately at the solid-state medium and SESAM by the concave mirrors M1, M2, and 84, in order to reduce the beam radius $\omega_L$ at the laser medium and the beam radius $\omega_A$ at the SESAM.

The spot sizes (beam radius of the oscillation light) on the laser medium and SESAM are reduced for the following two reasons. First reason is to reduce the threshold value of laser oscillation, and the second reason is to satisfy the soliton mode locking condition.

The first reason will now be described. The laser oscillation threshold $P_{th}$ is represented by Formula (1) below as described, for example, in Applied Optics, Vol. 36, No. 9, pp. 1867-1874, 1997 (Non-Patent Document 2).

$$P_{th} = \frac{\pi h \nu_P (\omega_L^2 + \omega_P^2)}{4\sigma\tau\eta_a(f_1 + f_2)}(L_i + T_{OC} + 2f_1\sigma N_0 l_s) \tag{1}$$

where, $\omega_P$ is the excitation light beam radius at the solid-state medium, $h\nu_p$ is the excitation light photon energy, $\sigma$ is the cross-section of stimulated emission of the solid-sate laser medium, $\tau$ is the upper level life time, $\eta_a$ is the absorption efficiency, $f_1$ is the lower level occupancy, $f_2$ is the upper level occupancy, $L_i$ is the intracavity loss of the resonator, $T_{oc}$ is the output mirror transmittance, $N_0$ is the rare earth ion dope density, and $l_s$ is the crystal length.

Formula (1) above shows that it is only necessary to reduce the oscillation beam radius $\omega_L$ and excitation light beam radius $\omega_P$ in the solid-state laser medium in order to reduce the oscillation threshold.

Next, the second reason, that is, the soliton mode locking condition will be described. As described in Non-Patent Document 3, it is known that mode locking mixed with Q-switching operation (Q-switched mode locking) occurs in a soliton mode-locked laser apparatus under a certain condition. The Q-switched mode locking is an operation mode in which a mode-locked pulse train (frequency in the range from 10 MHz to 1 GHz, pulse width in the range from picoseconds to femtoseconds) is disposed in a long pulse of Q-switched pulse (frequency in the range from 1 KHz to several 100 KHz, pulse width in the range from microseconds to nanoseconds).

This operation mode is generally undesirable other than for energy application due to instability in output, pulse width, and pulse period. According to the Non-Patent Document 3, the condition not to cause Q switching in the soliton mode locking using a saturable absorption mirror are expressed by Formula (2) below.

$$F_{sat,L} \cdot A_{eff,L} \cdot g \cdot K^2 E_P^3 + E_P^2 > F_{sat,L} \cdot A_{eff,L} \cdot F_{sat,A} \cdot A_{eff,A} \cdot \Delta R \tag{2}$$

where: $E_p$ is the intracavity pulse energy; $\Delta R$ is the modulation depth of the saturable absorption mirror; $F_{sat,A}$ is the saturated fluence of the saturable absorption mirror; $F_{sat,L}$ ($=h\nu/\sigma$) is the saturated fluence of the laser medium; $h\nu$ is the oscillation laser photon energy; $A_{eff,A}$ ($=\pi\omega_A^2$) is the oscillation light beam cross section at the saturable absorption mirror; $A_{eff,L}$($=\pi\omega_L^2$) is the oscillation light beam cross section at the laser medium, g is the laser gain of the laser medium, and K is the following.

$$K = \frac{4\pi n_2 ls}{|D|A_{eff,L}\lambda_0 \Delta v_G} \frac{0.315}{1.76}$$

(where, $n_2$ is the nonlinear refraction index of the laser medium, D is the group velocity dispersion of the entire resonator for one round-trip (D<0), $\lambda_0$ is the center frequency of the oscillation light, and $\Delta v_G$ is the gain bandwidth.) Note that, in Formula (2) above, the solution of $E_p$ when the left term corresponds to the right term is the mode locking threshold, and to satisfy Formula (2) means to set the $E_p$ to a value greater than the mode locking threshold.

Formula (2) shows that it is necessary to reduce the beam cross section at the laser medium and the beam cross section at the SESAM, and/or to increase the intracavity pulse energy $E_p$ in order to avoid generation of the Q-switched mode locking.

Because of the aforementioned reasons, most of conventional apparatuses like that shown in FIG. 17 employ a configuration in which a laser medium is placed between two concave mirrors to narrow down the beam, and at the same time beam focusing is performed on the SESAM by a concave mirror.

In the mean time, U.S. Pat. No. 7,106,764 (Patent Document 1) and Japanese Unexamined Patent Publication No. 11 (1999)-168252 (Patent Document 2) propose configurations to downsize mode-locked solid-sate laser apparatuses having a negative group velocity dispersion element in the resonator. More specifically, Patent Document 1 proposes a mode-locked solid-state laser apparatus downsized by disposing the solid-state laser medium and SESAM in close proximity to each other, while Patent Document 1 proposes a mode-locked solid-state laser apparatus in which a saturable absorption mirror is formed on a solid-state laser medium by coating and a negative dispersion mirror doubles as the output mirror to reduce the number of optical components and to downsize the apparatus.

The conventional mode-locked solid-state laser apparatus having the configuration described above and illustrated in FIG. 17 requires at least three concave mirrors, and in some cases further require a plurality of mirrors for beam replication. This increases the number of optical components of the mode-locked solid-state laser, and the apparatus cost is increased.

Here, the size of a conventional mode-locked solid-state laser apparatus is discussed more specifically. The distance between the concave mirror and the laser medium, and between the concave mirror and SESAM is usually set to a value about half the curvature radius, which alone amounts to about 150 mm (when curvature radius is 100 mm) to 300 mm (when curvature radius is 200 mm) in total. Further, when considering an insertion space for a negative dispersion element or the like, the resonator requires a length of about 500 mm to 1 m, so that the laser apparatus inevitably become large. Generally, when a resonator of a meter length is formed in a solid-state laser, stable operation is difficult. For this reason, the conventional apparatuses have low laser oscillation stability.

Further, the laser apparatus includes a complicated excitation optical system formed of a combination of a plurality of lenses for sufficiently focusing laser light emitted from the excitation light source, such as LD or the like, before inputting to the solid-state laser medium in order to reduce the beam radius $\omega_p$ in the solid-state laser medium, thus the excitation optical system tends to be large.

Patent document 1 and Patent Document 2 describe example resonators downsized through linear configuration, but the excitation optical system is structured so as to input excitation light through a concave mirror, as in the example described above, therefore downsizing of the excitation optical system is not sufficient.

In view of the circumstances described above, it is an object of the present invention to provide a small, low cost, and highly stable solid-state laser apparatus capable of realizing femtosecond CW mode locking.

SUMMARY OF THE INVENTION

A mode-locked solid-state laser apparatus of the present invention is an apparatus, including:

an output mirror that forms a first end of a resonator;

a saturable absorption mirror that forms a second end of the resonator;

a solid-state laser medium disposed at a position inside of the resonator where the distance from the saturable absorption mirror is not greater than twice a Rayleigh length;

an excitation optical system that inputs excitation light from outside into the resonator;

a negative group velocity dispersion element, disposed inside of the resonator, that causes group velocity dispersion of the entire resonator to be not greater than 0 when light makes one round trip in the resonator; and a dichroic mirror, disposed inside of the resonator, that reflects the excitation light inputted from outside into the resonator by the excitation optical system toward the solid-state laser medium and transmits oscillation light.

Here, the Rayleigh length is a value defined by $Z_R = \omega_A^2/\lambda$, which is, here, the distance in the optical axis direction from the beam waist ($\omega_A$, here) where the beam radius of the oscillation light becomes root 2 times the waist. The referent of "not greater than twice the Rayleigh length" may include a case in which the distance between them is 0, that is, the saturable absorption mirror and the solid-state laser medium are brought into close contact with each other.

In the resonator, it is preferable that the negative group velocity dispersion element, dichroic mirror, and solid-state laser medium are disposed in this order from the output mirror side.

Further, in the mode-locked solid-state laser apparatus according to the present invention, it is preferable that a rare earth doped base material is used as the solid-state laser medium. Such a rare earth may be ytterbium (Yb), erbium (Er), or neodymium (Nd).

Still further, preferable examples of the solid-state laser medium doped with a rare earth include Yb:YAG($Y_3Al_5O_{12}$), Yb:KYW(K(WO$_4$)$_2$), Yb:KGW(KGd(WO$_4$)$_2$), Yb:Y$_2$O$_3$, Yb:Sc$_2$O$_3$, Yb:Lu$_2$O$_3$, Er,Yb:glass, Nd:glass, and the like.

In the mode-locked solid-state laser apparatus according to the present invention, it is preferable that the saturable absorption mirror has an absorption modulation depth $\Delta R$ not less than 0.4%, and the absolute value |D| (D<0) of a total intracavity dispersion amount D when light having a predetermined wavelength makes one round trip in the resonator, which is represented by the following relational expression, is set within a pulse bandwidth in which operation modes other than a fundamental period soliton pulse can be suppressed by the saturable absorption mirror.

$$\tau_P = \frac{1.76|D|\lambda_0 A_{\mathit{eff},L}}{4\pi n_2 ls} \frac{1}{E_P}$$

(where, $\tau_P$ is the pulse width, $\lambda_0$ is the center wavelength, $A_{\mathit{eff},L}$ ($=\pi\omega_L^2$) is the oscillation light beam cross section at the laser medium, $n_2$ is the nonlinear refraction index, $l_s$ is the crystal length of the laser medium, and $E_P$ is the intracavity pulse energy.)

Figures 1, 2:
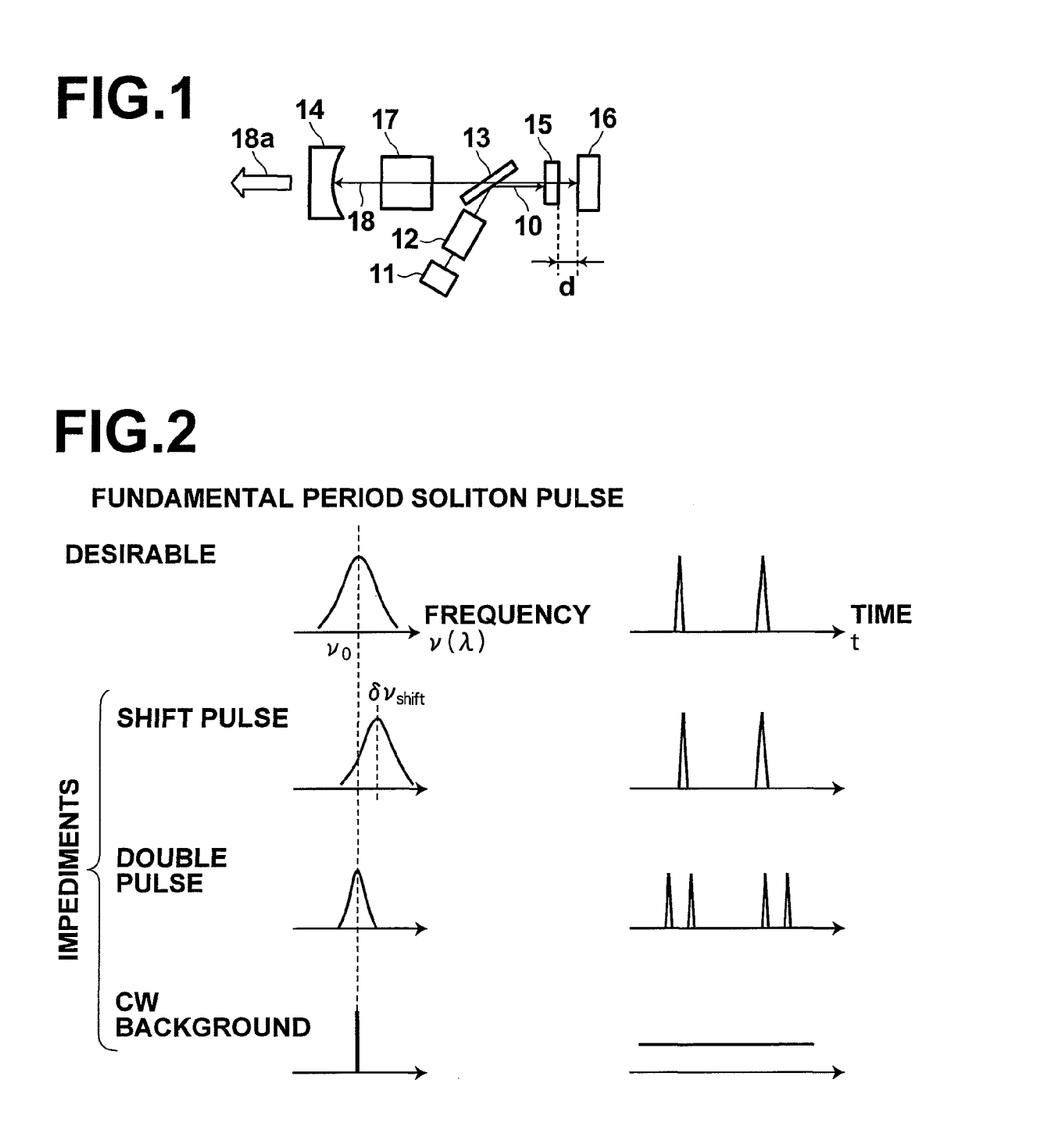
FIG. 1 is a schematic side view of a mode-locked solid-state laser apparatus according to an embodiment of the present invention.
FIG. 2 illustrates a phenomenon of pulse competition in the mode-locked solid-state laser apparatus.

The referent of "operation modes other than a fundamental period soliton pulse" means competitive pulses generated in competition with the fundamental period soliton pulse in the resonator, such as a double pulse, CW background, and the like (FIG. 2).

The competitive pulses generated in competition with the fundamental soliton pulse will be described briefly with reference to FIG. 2 and Table 1. The shift pulse has identical pulse bandwidth and pulse energy to those of the fundamental soliton pulse, but the center frequency thereof is shifted by $\delta v_{\mathit{shift}}$ in comparison with the fundamental soliton pulse. The CW background is not a pulse but a component operating in continuous wave in the time domain, and appears as a narrow linewidth in spectrum. The double pulse is a two-pulse train, each having half energy and a half pulse bandwidth of the fundamental soliton pulse. All of these are frequency shifted from the fundamental soliton, but the CW background and double pulse are depicted with a shift amount of 0 in FIG. 2 for clarity.

TABLE 1

| | Center Frequency | Pulse Energy (Arbitrary Unit) | Pulse Bandwidth (Frequency) |
|---|---|---|---|
| Soliton Pulse | $v_0$ | 1 | $\Delta v_P$ |
| Shift Pulse | $v_0 - \delta v_{\mathit{shift}}$ | 1 | $\Delta v_P$ |
| CW Background | $v_0 - \delta v_{CW}$ | — | Narrow Linewidth |
| Double Pulse | $v_0 - \delta v_{\mathit{double}}$ | ½ | $\Delta v_P/2$ |

Note that the shift pulse is a pulse that can not be suppressed by the absorption modulation depth of the saturable absorption mirror and not included in the referent of "operation modes other than a fundamental period soliton pulse" above.

The total intracavity dispersion amount D is expressed as the relational expression described above in relation to the pulse width (note that the pulse width is inversely proportional to the pulse bandwidth), which is set to a value in the range obtained from the pulse bandwidth in which competitive pulses generated by spatial hole burning effects (double pulse and CW background) can be suppressed at an absorption modulation depth of the saturable absorption mirror set to a predetermined value not less than 0.4%.

The inventors of the present invention have found, in the process of downsizing a mode-locked solid-state laser apparatus, that soliton mode-locked pulses can be generated even in a configuration that does not form the beam waist on the laser medium by disposing the laser medium and SESAM at a distance not greater than twice a Rayleigh length.

Further, the inventors of the present invention have found that there are certain restrictions on the absorption modulation depth of the saturable absorption mirror and the total intracavity dispersion amount for mode stability when the apparatus is structured small, and have clarified the restrictions.

The discovery of the conditions with respect to the absorption modulation depth $\Delta R$ of the saturable absorption mirror and the total intracavity dispersion amount D are the results of detailed study of mode locking stability made by the inventors, and the these knowledges are the basis of the present invention.

The present invention covers a system in which spatial hole burning effects are present, and a system in which the laser medium is disposed near the center of the resonator and the spatial hole burning effects can be ignored as described, for example, Non-Patent Document 3 is outside of the scope of the present invention.

Preferably, in the mode-locked solid-state laser apparatus according to the present invention, the resonator is structured as a linear resonator.

Preferably, in the mode-locked solid-state laser apparatus according to the present invention, a cavity mode waist diameter is not greater than 100 μm. The "diameter" is defined as an area in which light intensity is not less than $1/e^2$ of the maximum intensity in a beam intensity distribution on a cross section orthogonal to the light travelling direction.

As for the negative group velocity dispersion element described above, either one of a prism pair, a diffraction grating pair, and a negative dispersion mirror pair or a combination of two or more of them is preferably used.

Further, in the mode-locked solid-state laser apparatus according to the present invention, it is particularly preferable that a transmission type negative group velocity dispersion mirror having also a function of the output mirror forming one end of the resonator is used as the negative velocity dispersion element.

Still further, in the mode-locked solid-state laser apparatus according to the present invention, where the solid-state laser medium is Yb:KYW, it is preferable that the total intracavity dispersion amount D is in the range from −2500 fsec$^2$ to less than 0 fsec$^2$.

Where the solid-state laser medium is Yb:KGW, it is preferable that the total intracavity dispersion amount D is in the range from −5750 fsec$^2$ to less than 0 fsec$^2$.

Where the solid-state laser medium is Yb:YAG, it is preferable that the total intracavity dispersion amount D is in the range from −1750 fsec$^2$ to less than 0 fsec$^2$.

Where the solid-state laser medium is Yb:Y$_2$O$_3$, it is preferable that the total intracavity dispersion amount D is in the range from −3250 fsec$^2$ to less than 0 fsec$^2$.

Where the solid-state laser medium is Yb:Lu$_2$O$_3$, it is preferable that the total intracavity dispersion amount D is in the range from −3000 fsec$^2$ to less than 0 fsec$^2$.

Where the solid-state laser medium is Yb:Sc$_2$O$_3$, it is preferable that the total intracavity dispersion amount D is in the range from −3000 fsec$^2$ to less than 0 fsec$^2$.

Further, where the solid-state laser medium is Er, Yb:glass, it is preferable that the total intracavity dispersion amount D is in the range from −1200 fsec$^2$ to less than 0 fsec$^2$.

Still further, in the mode-locked solid-state laser apparatus according to the present invention, the resonator length is preferable to be not greater than 200 mm, more preferably not greater than 100 mm, further preferably not greater than 75 mm, and most preferably not greater than 50 mm.

The mode-locked solid-state laser apparatus of the present invention includes a resonator with resonator ends formed by an output mirror and a SESAM respectively, and is capable of realizing a small beam cross section of oscillation light in a laser medium without forming the beam waist of the oscillation light in the laser medium by disposing the laser medium at a distance from the SESAM which is not greater than twice a Rayleigh length. That is, whereas in the conventional method, the laser medium is placed between two concave mirrors to form a beam waist therein, in addition to forming a beam waist on the SESAM, in the present invention, it is not necessary to form a plurality of beam waists by disposing the laser medium and SESAM in extremely close proximity (or brought into contact with each other), thereby the apparatus may be structured small.

Further, a configuration is adopted in which the excitation light is guided to the laser medium by a dichroic mirror inserted in the resonator. This allows the excitation optical system to be made significantly small, simple and low cost, while conventional apparatuses require a large and complicated excitation optical system like that shown in FIG. 17.

Problems of the excitation optical system in conventional apparatuses will now be described in more detail. The excitation is implemented through a mirror constituting the resonator (a concave mirror with a curvature radius of 20 cm in FIG. 17), so that the apparatus became large, complicated, and high cost. The specific excitation optical system of conventional apparatuses is like the following. When the excitation light is focused on the solid-state laser medium, it is often the case that the beam spot in the slow axis direction (direction parallel to the emitter) of the excitation semiconductor laser is focused at a magnification approximately from 1:1 to 1:2. Here, in a configuration in which the excitation light is inputted to the resonator through the concave mirror of the resonator as shown in FIG. 17, the distance from the concave mirror to the laser medium corresponds approximately to the back focal length of the excitation optical system. In order to realize this by a single lens system, roughly a half the distance or equivalent distance is required in front of the excitation optical system. Generally, a concave with a curvature radius of about 100 to 200 mm is used as the concave mirror, so that the distance between the concave mirror and laser medium needs to be half the value, 50 to 100 mm. Thus, the distance from the semiconductor laser to the laser medium needs to be from 75 mm (with concave curvature radius of 100 mm and 1:2 focusing) to 200 mm (with concave curvature radius of 200 mm and 1:1 focusing).

Further, as shown in FIG. 17, a plurality lens system is generally used, instead of a single lens system. Since the divergence angle of the fast axis (direction orthogonal to the emitter) of excitation semiconductor laser is large, a collimating and focusing lens system for the fast axis and a collimating and focusing lens system for the slow axis are generally used. In such a configuration, at least three to four lenses are required, including a fast axis collimating lens, a slow axis collimating lens (and possibly a slow axis magnifying lens), and a focusing lens. As described above, the excitation through a resonator mirror poses a problem that the excitation optical system tends to become large and complicated.

In contrast, in the present invention, the dichroic mirror is disposed in the resonator as described above, so that the excitation light source and laser medium can be disposed significantly in close proximity to each other in comparison with the conventional apparatus. That is, both the front and back focal lengths of a lens of the excitation optical system can be reduced significantly. Consequently, a single lens, such as a graded-index lens or the like may be used as the excitation optical system. In this way, the excitation optical system can be made simple and small, so that the entire solid-state laser apparatus can be made small.

In addition, the apparatus may be produced at low cost and stable laser output may be obtained since components of the entire apparatus can be reduced significantly and the apparatus is downsized.

In the mean time, where the saturable absorption mirror (SESAM) and laser medium are disposed in close proximity to each other to a large degree in comparison with the conventional apparatus, the spatial hole burning effects appear significantly, which is closely combined with the mode locking and the stable condition is influenced by this. Note that, as a literature on such stable condition, Applied Physics B, Vol. 72, pp. 267-278, 2001 (Reference Document 1) is known. But the literature discusses only a limited condition, and does not clearly describe the condition of extending the stable range of mode locking.

The preferred embodiment of the present invention that defines the absorption modulation depth $\Delta R$ and total intracavity dispersion amount D has been obtained by discovering conditions to extend the stable range of mode locking as a result of detailed study of mode locking stability. Hereinafter, the description will be made on that point.

It is known from the following literatures that so-called spatial hole burning effects occur differently in the resonator depending on the position of the optical axis of the laser medium acting as a gain medium, which are then combined with the mode locking phenomenon and influence the stability of the mode locking: Reference Document 1, Applied Physics B, Vol. 61, pp. 429-437, 1995, and Applied Physics B vol. 61, pp. 569-579, 1995.

On the surface of a reflection mirror constituting the resonator, phase jumping occurs in the lightwave field inside thereof which produces a "node" where the field intensity falls to 0. Where the laser medium is disposed adjacent to the reflection mirror, a spatial stripe pattern of laser lightwave intensity is developed in the laser medium by the phase jumping, which is called the spatial hole burning. It is known that there is the following difference between a case in which the laser medium is disposed adjacent to the reflection mirror and a case in which it is disposed in the middle of the resonator. The literature, Optics Letters, Vol. 25, no. 11, pp. 859-861, 2000, describes that stable mode locking is obtained only with a pulse width adjacent to 700 fsec in a LD-excited thin disk Yb:YAG (Yb:$Y_3Al_5O_{12}$) laser in which the reflection mirror and solid-state laser medium is disposed closely, and stable CW mode locking is not obtained with the other pulse widths. On the other hand, it is known that a wider pulse width range (90 psec to 800 fsec) can be realized in a system with reduced spatial hole burning (physically equivalent to the case in which the laser medium is spaced apart from the reflection mirror) as described, for example, in the literature, Optics Letters, vol. 26, No. 6, pp. 379-381, 2001.

Reference Document 1 describes that where the laser medium is disposed adjacent to the reflection mirror, a depression occurs in the gain spectrum, and it causes instability of the soliton pulses traveling round inside the resonator. More specifically, the spatial hole burning effects appear more strongly adjacent to the reflection mirror, so that the gain stripe pattern developed in the laser medium by the spatial hole burning leads to modulation of the gain spectrum in the frequency domain. Eventually, the gain is preferentially given to phenomena (shift pulse, double pulse, CW background) competing with the desired pulse. This causes the desired soliton pulse to lose the competition and the pulse phenomena described above to occur, leading to the instability.

In the configuration according to the present invention, the saturable absorption mirror functioning as the reflection mirror and laser medium are disposed in close proximity to each other (or in contact with each other), so that that the spatial hole burning may possibly occurs significantly, leading to significant instability of the soliton pulse.

Reference Document 1 discusses only 700 fsec pulse operation in 1030 nm oscillation in a LD-excited Yb:YAG laser. Furthermore, it discusses only the operation in a high output power region of several tens of watts. Mode locking stabilization conditions for other transition elements that can be expected to provide short pulses in the range from 100 to 200 fsec, for example, 1050 nm oscillation of Yb:YAG, Yb:KYW (Yb:KY(WO$_4$)$_2$) crystal, Yb:KGW(Yb:KGd (WO$_4$)$_2$) crystal, Yb:Y$_2$O$_3$, Yb:SC$_2$O$_3$, Yb:Lu$_2$O$_3$, Er,Yb: glass, Nd:glass are not discussed in any way.

The inventors of the present invention have found that soliton pulse can be stably generated by setting the absorption modulation depth of the saturable absorption mirror not less than 0.4%, and setting the total intracavity dispersion amount |D| that satisfies the relational expression above to a value corresponding to a pulse bandwidth in which the competitive pulses can be suppressed by the saturable absorption mirror. The inventors have also disclosed that a total intracavity dispersion amount of as much as minus several tens of thousands of fsec$^2$ is required in some cases. Heretofore, appropriate values for the total intracavity dispersion amount D and absorption depth ΔR have not been known and it has been difficult to stabilize CW mode locking. But, by satisfying the above conditions according to a preferred embodiment of the present invention, a mode-locked solid-state laser apparatus capable of achieving stable soliton mode locking can be realized easily.

DESCRIPTION OF THE PREFERRED EMBODIMENTS

Hereinafter, exemplary embodiments of the present invention will be described with reference to the accompanying drawings.

FIG. 1 is a schematic side view of a soliton mode-locked solid-state laser apparatus according to an embodiment of the present invention. As illustrated, the mode locked solid-state laser apparatus includes a semiconductor laser 11 that emits excitation light (pumping light) 10, an excitation optical system 12 that inputs the excitation light 10 into a resonator, a dichroic mirror 13 disposed inside of the resonator that reflects the excitation light 10 inputted into the resonator at an angle with respect to the optical axis thereof from the outside by the excitation optical system 12 toward a solid-state laser medium 15 and transmits oscillation light 18 oscillating within the resonator, a concave output mirror 14 constituting a first end of the resonator, a SESAM (semiconductor saturable absorption mirror) 16 constituting a second end of the resonator, the solid-state laser medium 15 disposed inside of the resonator formed by the SESAM 16 and output mirror 14, and a negative dispersion element 17 also disposed inside of the resonator.

In the present embodiment, a Yb:KYW crystal is used, by way of an example, as the solid-state laser medium 15. As for the semiconductor laser 11, a semiconductor laser that emits excitation light 10 with a wavelength of 980 nm is used for exciting the solid-state laser medium 15. As for the dichroic mirror 13, a dichroic mirror that transmits the excitation light 10 with a wavelength of 980 m and reflects solid-state laser oscillation light 18 with a wavelength of 1045 nm is used. As for the negative dispersion element 17, one of a prism pair, a diffraction grating pair, and a negative dispersion mirror like those described above or a combination of two or more of them is used.

The solid-state laser medium 15 and SESAM 16 are disposed in close contact with each other or in close proximity within a distance d which is not greater than twice a Rayleigh length determined by a resonator mode radius (beam radius of oscillation light) formed on the SESAM 16.

In the configuration described above, the excitation light 10 emitted from the semiconductor laser 11 and inputted into the resonator at an angle with respect to the optical axis thereof by the excitation optical system 12 is reflected by the dichroic mirror 13 and incident on the solid-state laser medium 15. This causes the solid-state laser medium 15 to be excited and 1045 nm light generated thereby is oscillated by the operation of the resonator. A portion of the solid-state laser oscillation light 18 transmits through the output mirror 14 and outputted to the outside as output light 18a.

In the apparatus having the present configuration, the beam waist of the laser oscillation light 18 generated in the resonator is formed only on the SESAM 16.

Here, the negative group velocity dispersion by the operation of the negative dispersion element 17 in the laser resonator and the self phase modulation mainly in the solid-state laser medium 15 are combined, thereby the pulse oscillation light 18 in the femtosecond region is obtained. More specifically, mode locking is initiated by the SESAM 16 to maintain and stabilize the pulses, and at the same time the mode-locked pulses become sharp through soliton pulse forming which occurs by balancing the group velocity dispersion with the self phase modulation, thereby stable femtosecond-class soliton pulse generation becomes possible.

The condition of twice the Rayleigh length will now be described. This condition is obtained by the inventors of the present invention by examining Formulae (1) and (2) above for causing soliton mode locking and obtaining continuous pulse generation in a solid-state laser apparatus. Too large beam diameter of oscillation light at the solid-state medium poses a problem that the oscillation threshold and CW mode locking threshold become too great and laser oscillation does not take place, or otherwise modes are not locked and the laser oscillation does not take place. But, where the solid-state laser medium is disposed at a position no greater than twice the Rayleigh length from the beam waist of the oscillation light, soliton mode locking can be obtained.

Where the solid-state laser medium 15 and SESAM 16 are spaced apart about twice the Rayleigh length, the spot size (oscillation light beam radius) $\omega_L$ at the solid-state laser medium 15 becomes 2.2 times as broad as the spot size at the oscillation light beam waist $\omega_A$. From Formula (1) above, this causes the laser oscillation threshold to be increased by 4.8 times in comparison with the configuration in which the oscillation light beam waist is positioned at the solid-state laser medium 15. If the beam radius $\omega_A$ at the beam waist is assumed to be about 25 μm, however, the oscillation light beam radius $\omega_L = 2.2 \times 25$ μm, which allows the oscillation threshold to be not greater than 100 mW. Here, note that the Rayleigh length is 1.9 mm, hence twice the Rayleigh length is 3.8 mm. If the oscillation threshold is kept below or equal to 100 mW, sufficiently high oscillation output can be ensured and CW mode locking is realized without any problem.

In the present apparatus, the excitation light 10 is inputted into the resonator from a direction that crosses the optical axis of the resonator and reflected by the dichroic mirror 13 disposed on the resonator optical axis within the resonator, thereby guided to the solid-state laser medium. The dichroic mirror 13 reflects the excitation light with high reflectance (reflectance ratio greater than 85%) and transmits the laser oscillation light without reflection (reflectance ratio smaller than 0.5%). Consequently, degradation in laser oscillation efficiency due to insertion of the mirror is minimized and the use of the dichroic mirror 13 offers an advantage that the excitation light source can be moved closer to the solid-state laser medium in comparison with the conventional optical system. Note that, 45 degree incidence or Brewster's angle incidence is preferable for the dichroic mirror 13. The dichroic mirror 13 only requires application of coating design according to the incident angle of the excitation light.

Further, the dichroic mirror allows the use of a single lens, such as a graded-index lens (GRIN lens) or the like as the excitation optical system. The reason for this results from the fact that the distance from the solid-state laser medium to the excitation optical system lens can be reduced. Actually, if a 1:2 focusing system is structured using a GRIN lens with, for example, a pitch of 0.23 and an effective focal length of 1.94 mm (Thorlabs, Inc., lens length of 4.42 mm, lens diameter of 1.8 mm), then $d1=\frac{2}{3}$ f=1.3 mm, $d2=2\times d1=2.6$ mm. Even when the lens length is added to this, the result is only about 1.3+2.6+4.4=8.3 mm. In this way, the system can be structured extremely small. In contrast, if 1:2 optical magnification is realized by the configuration in which the excitation light is inputted through the concave mirror, as in the conventional apparatus shown in FIG. 17, a length of as long as 75 to 200 mm is required by itself as described above. Accordingly, it can be said that an extremely small excitation optical system is realized by the present invention.

As described above, disposition of the solid-state laser medium and SESAM at a distance not greater than twice the Rayleigh length allows to satisfy Formulae (1) and (2) above, and to downsize the mode-locked solid-state laser apparatus. That is, disposition of the solid-state laser medium and SESAM at the aforementioned distance allows to configure a small solid-state laser apparatus capable of generating soliton pulses.

As described above, disposition of the solid-state laser medium and SESAM (reflection mirror) in close proximity, however, poses the problem of occurrence of spatial hole burning which causes the competitive process and the generated soliton pulses are disturbed by the competitive pulses.

The inventors of the present invention have revealed that the competitive pulses generated by the spatial hole burning can be suppressed and stable soliton pulse operation can be realized by setting the absorption modulation depth ΔR of the SESAM and total intracavity dispersion amount D to values within predetermined ranges respectively.

Figure 3:
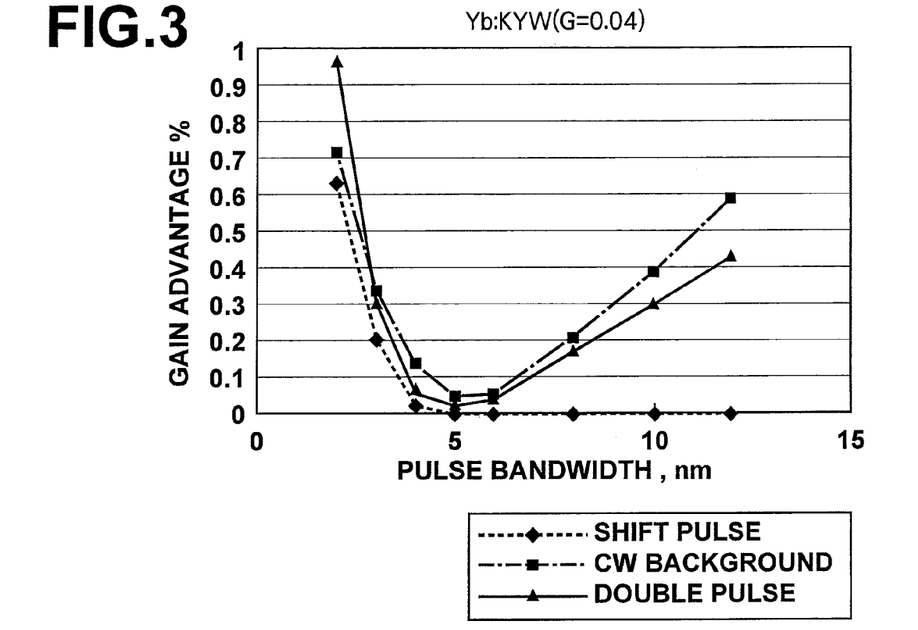
FIG. 3 is a graph illustrating, by way of an example, the relationship between pulse bandwidth and gain advantage in the mode-locked solid-state laser apparatus.

Now turning to FIG. 3, there is shown the dependency of the gain advantages ΔG of competitive pulses generated by spatial hole burning on the spectrum bandwidth $\Delta\lambda_p$ (in terms of wavelength bandwidth) of a soliton pulse calculated for a Tb:KYW crystal. The gain advantage ΔG is obtained by the inventors of the present invention using the formula described in Reference Document 1 with respect to a mode-locked solid-state laser apparatus structured in the manner shown in FIG. 1. The horizontal axis of the graph represents the spectrum bandwidth $\Delta\lambda_p$ of a soliton pulse in laser oscillation. Here, the gain G of the fundamental period soliton pulse is assumed to be 0.04 (G=0.04). (Although depends on the power of the excitation light, spot diameter, and configuration of the apparatus, this value is selected as the value of a practical configuration.) The gain advantage as used herein means a gain difference between each competitive process (shift pulse, CW background, double pulse) and soliton pulse. FIG. 3 shows that these competitive processes always have slightly higher gains than the soliton pulse. In order to obtain CW mode locking with desired fundamental soliton, it is necessary to suppress these competitive pulses.

The SESAM 16 has nonlinear reflection properties according to the pulse energy $E_p$ as described, for example, in Non-Patent Document 3, which is effective to suppress the CW background and double pulse of these competitive processes. More specifically, it is known that CW background can be suppressed if the gain advantage ΔG is not greater than half the modulation depth ΔR, that is not greater than ΔR/2. While, double pulse can be suppressed if the ΔG is not greater than ΔR/S (where, $S=E_p/(F_{sat,A} \cdot A_{eff,A})$, which is the saturation level of SESAM).

That is, the CW background and double pulse can be suppressed in the pulse bandwidth in FIG. 3 that satisfies ΔG (CW)≦ΔR/2 and ΔG (DP)≦ΔR/S.

In the mean time, shift pulse can not be suppressed by the SESAM 16. The reason is that the shift pulse has equivalent pulse width, pulse bandwidth, and energy to those of the fundamental soliton pulse and shifted on the frequency axis (Table 1 and FIG. 3), which gives the same saturation level to the SESAM 16 so that they can not be discriminated by the SESAM 16.

Accordingly, soliton mode can be stably generated in a pulse bandwidth where the gain advantage ΔG of the shift pulse is nearly 0, and satisfies ΔG (CW)≦ΔR/2 and ΔG (DP) ≦ΔR/S. Note that, in most cases, the lower limit of pulse bandwidth where the soliton mode can be stably generated is restricted by the shift pulse because it can not be suppressed by the SESAM 16.

In the mean time, the pulse width τp can be related to the absolute value |D| of the intracavity dispersion amount D in the following proportional relation (Non-Patent Document 3).

$$\tau_P = \frac{1.76|D|\lambda_0 A_{eff,L}}{4\pi n_2 ls} \frac{1}{E_P} \quad (3)$$

Figure 4:
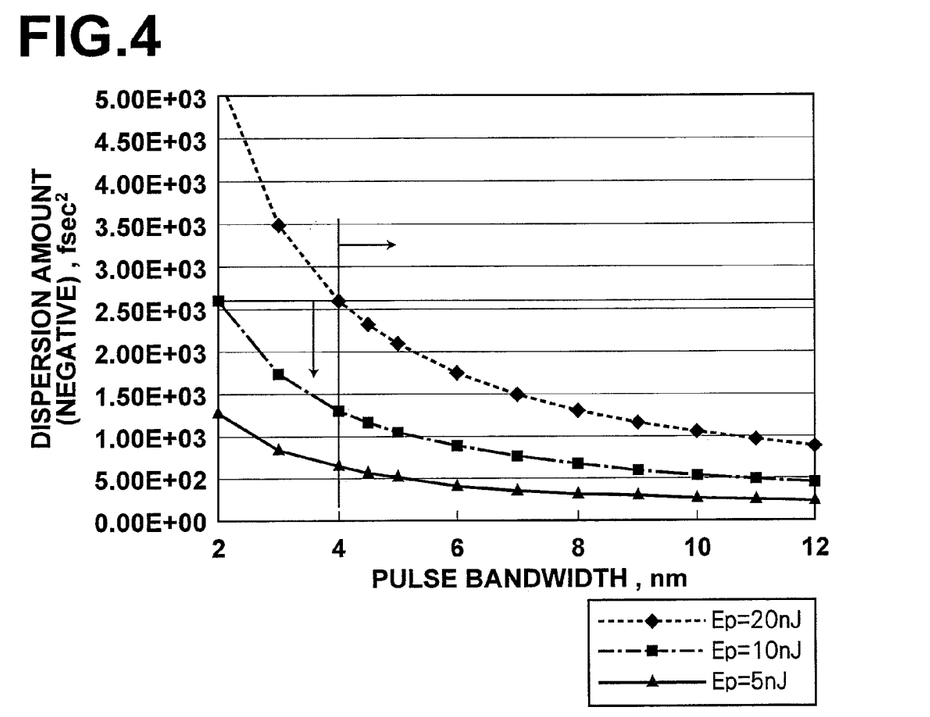
FIG. 4 is a graph illustrating the relationship between pulse bandwidth and required amount of dispersion.

By considering these, the inventors of the present invention have revealed that restriction on the pulse bandwidth for stable soliton mode is equivalent to the restriction on the total intracavity dispersion amount D and it is necessary to set the intracavity dispersion amount D to a value in an appropriate range according to the absorption depth of the SESAM in order to stably generate soliton mode by suppressing spatial hole burning. FIG. 4 illustrates the dependency of the total intracavity dispersion amount on the pulse bandwidth (pulse width is inversely proportional to the pulse bandwidth) obtained from Formula (3) above.

From the relationship described above, the inventors of the present invention have found that soliton pulses can be stably generated by providing a saturable absorption mirror having a absorption modulation depth ΔR and a saturation level S that satisfy, for the gain advantage G (DP) of the double pulse with respect to the fundamental soliton pulse in the resonator and the gain advantage G (CW) of the CW background with respect to the fundamental soliton pulse, ΔG (CW)≦ΔR/2 and ΔG (DP)≦ΔR/S ------- (A), and configuring the apparatus such that the absolute value |D| of the total intracavity dispersion amount D for one round trip of light with a predetermined wavelength inside the resonator becomes a value that falls within a range of the pulse bandwidth that satisfies (A) above and G (SP)≈0, in which G (SP) is the gain advantage of the shift pulse with respect to the fundamental soliton pulse.

Hereinafter, a discussion will be made using specific values.

In a typical mode-locked solid-state laser apparatus, the design value of saturation level S of the SESAM is about 3 to 5. Therefore, values within the range are assumed in the specific configurations of the present invention, in particular, S=4 is used below.

Turning to FIG. 3, the minimum value of the gain advantage ΔG of the double pulse is 0.05%, ΔG=0.05%, therefore it is necessary, when S=4, to set the absorption modulation depth to a value, $\Delta R_{min} \geq \Delta G \cdot S = 0.2\%$, as the minimum value.

The minimum value of the modulation depth ΔR of a typically manufactured SESAM is about 0.3%, and it is said that, for a system in which spatial hole burning does not occur, ΔR=0.3 to 2% is appropriate values for mode locking. Where ΔR=0.3% and S=4, however, the pulse bandwidth is restricted by the condition of ΔR/2=0.15% for suppressing the CW background so that the stable range of pulse bandwidth is limited from 4 to 7 nm. Further, from the double pulse suppression condition, ΔR/S=0.075%, which restricts the pulse bandwidth from 4.5 to 6.0 nm for stable pulse generation.

Further, from the shift pulse suppression condition, the pulse bandwidth is limited to a value not less than 4 nm (the gain advantage of the shift pulse becomes substantially 0 at a pulse bandwidth not less than 4 nm, as shown in FIG. 3). When the intersection set of these conditions is taken, the double pulse suppression condition is most strict which eventually allows pulses only in the range of pulse bandwidth from 4.5 to 6.0 nm. This is an extremely limited range in which only the pulse widths (center of 223 fsec±14%) from 254 fsec to 191 fsec (wavelength $\lambda_0$=1045 nm) are allowed as the Fourier transform-limited pulses.

In order to secure a wider pulse bandwidth to a certain degree, the absorption modulation depth of the SESAM is required not less than twice the minimum value $\Delta R_{min}$=0.2%, and the absorption modulation depth ΔR of a practical SESAM is not less than 0.4%, ΔR≧0.4%. ΔR of not less than 0.4% allows to the pulse bandwidth to be broadened.

For example, where ΔR=0.8% and S=4, the possible pulse bandwidth $\Delta\lambda_p$=4 to 8 nm, and the pulse width corresponding thereto is, $\tau_p$=287 to 143 fset. Where ΔR=1.4%, the pulse bandwidth can be broadened as wide as 4 to 11 nm which allows generation of a pulse with a pulse width from 287 to 104 fsec.

Where the absorption modulation depth of the SESAM is set to a predetermined value not less than 0.4% in the manner as described above, there is a restriction on the pulse bandwidth (pulse width) in which the double pulse and CW background can be suppressed by the ΔR value.

In the mean time, where a semiconductor laser of a type having an emitter width of about 100 μm with the output power of 3 W is assumed as the excitation light source, and further the following assumptions are made: a resonator length of 50 mm, a transmission efficiency of 85%, an absorption efficiency of 90%, a photoelectrical conversion efficiency of 30%, and an output coupling efficiency $T_{oc}$ of 1%, the pulse energy $E_p$ is approximately 23 nJ. This value is the approximate maximum pulse energy envisioned in the present invention (In a small apparatus like that shown in FIG. 1, which is a target apparatus of the present invention, greater pulse energy than this can not be achieved in theory).

In this case, FIG. 3 shows that a negative dispersion amount of 950 fsec² is required in order to generate a 104 fsec pulse (which corresponds to a pulse bandwidth of 11 nm). At the lower limit of the stable range, 4 nm, a negative dispersion amount of about 2500 fsec² is sufficient. The total intracavity dispersion amount D is also a function of the pulse energy $E_p$, so that the greater pulse energy requires a greater amount of dispersion. Therefore, this value is the upper limit of the absolute total intracavity dispersion amount for an apparatus envisioned in the present invention. The lower limit of the absolute value is determined to a value greater than 0, since reduced pulse energy requires a reduced total intracavity dispersion amount by that much, and the total intracavity dispersion amount may become 0, as shown in FIG. 3.

That is, in a mode-locked solid-state laser apparatus structured in the manner as shown in FIG. 1, where Yb:KWY is used as the solid-state laser medium and the absorption modulation depth ΔR is assumed to be not less than 0.4%, ΔR≧0.4%, the total intracavity dispersion amount D needs to be a value in the range from −2500 fsec² to less than 0. Note that the total intracavity dispersion amount D is further restricted depending on the apparatus configuration. For example, in the aforementioned example, where ΔR=0.8%, S=4, and $E_p$=20 nJ are assumed, the total intracavity dispersion amount D should fall within the range from −2500 to −1400 fsec², and where ΔR=1.4%, S=4, and $E_p$=20 nJ are assumed, the total intracavity dispersion amount D should fall within the range from −2500 to −1000 fsec².

Figure 5:
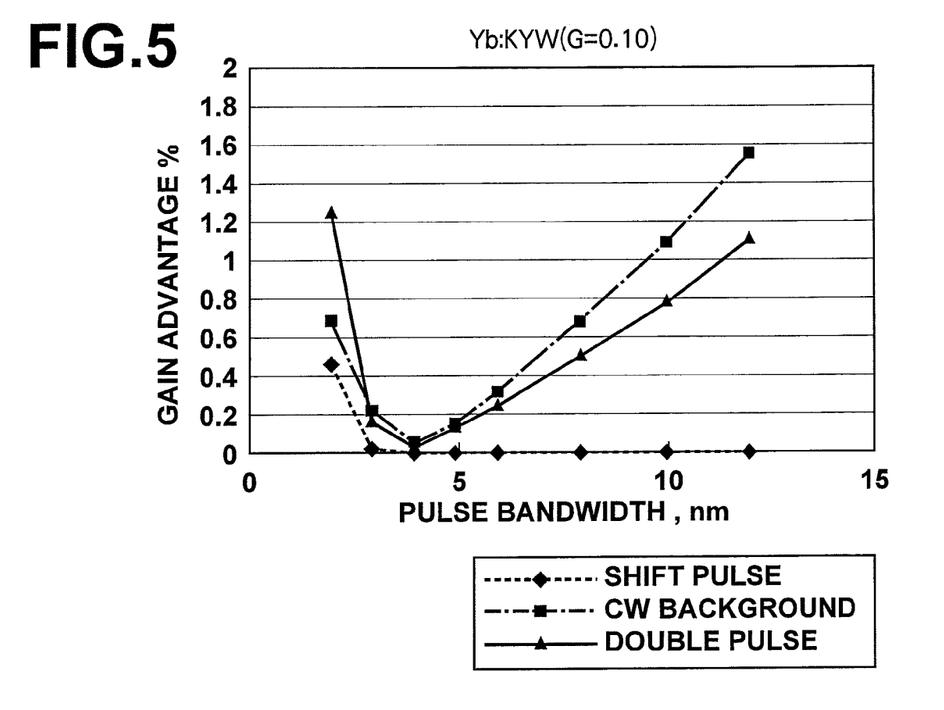
FIG. 5 is a graph illustrating, by way of an example, the relationship between pulse bandwidth and gain advantage in the mode-locked solid-state laser apparatus.

These conditions may be influenced by the laser operation conditions, but do not require significant changes. The reason is in the following. Where the pulse energy $E_p$ is low, the required amount of dispersion becomes small as the absolute value, as shown in FIG. 4, so that the aforementioned ranges do not need to be changed. Where the pulse energy is great, a negative dispersion amount which is greater than −2500 fsec² is required in terms of absolute value, but it is only doubled in mount at most. The reason is that more than doubling the pulse energy means more than doubling the resonator length to reduce the repetitions or more than doubling the light conversion efficiency, which are outside the envisioned scope of the present invention. The gain advantages ΔG of the competitive pulses when the gain (excitation power) is great, that is, when the gain G=0.10 are shown in FIG. 5. As illustrated in FIG. 5, the stable range of fundamental soliton pulse becomes narrower when the gain is increased, so that the ranges of the dispersion amount described above are sufficient.

Here, the maximum amount of dispersion (i.e., maximum pulse width) is defined in terms of absolute value, as the stabilizing condition but, in practice, it is desirable to obtain a shorter pulse width for laser application. Further, it is necessary to take into account that the operation is liable to become unstable adjacent to the stable/unstable boundary region when actually configuring the apparatus. Consequently, it is desirable to provide an allowance of about ⅕ for the dispersion amount. For example, where ΔR=0.8%, S=4, and $E_p$=20 nJ, more stable CW mode locking operation can be realized by setting the total intracavity dispersion amount to a value within the range from −2000 to −1700 fsec².

Figure 6:
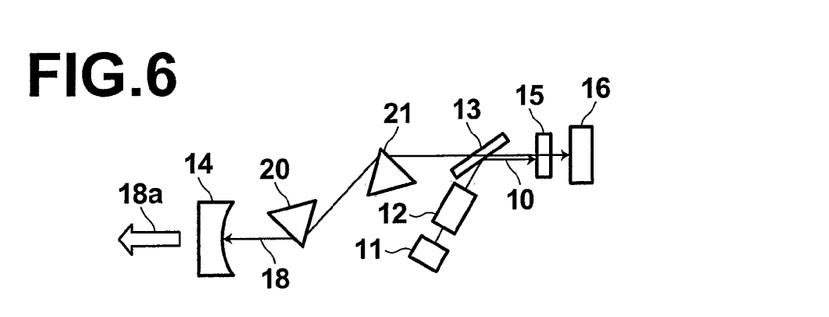
FIG. 6 is a schematic side view of a mode-locked solid-state laser apparatus according to another embodiment of the present invention.
Figure 7:
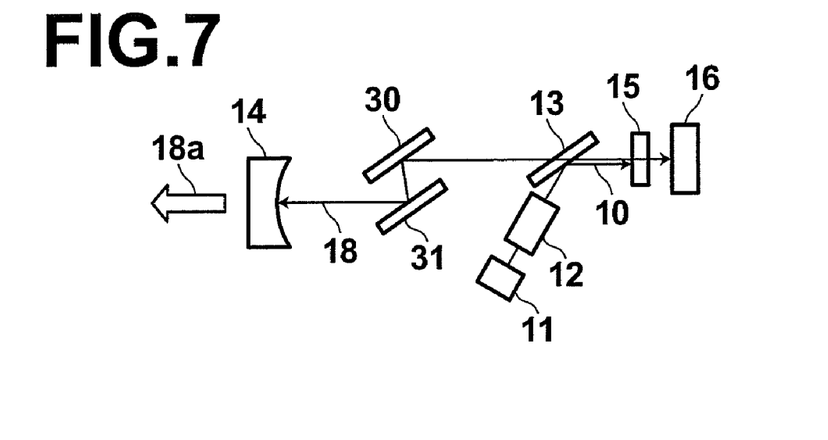
FIG. 7 is a schematic side view of a mode-locked solid-state laser apparatus according to still another embodiment of the present invention.

Still further, the absolute value of a maximum dispersion amount of commercially available dispersion mirrors is 1200 fsec², and if trying to provide the dispersion by one such mirror, it is necessary to set the ΔR so that the stable condition is obtained preferably with an absolute value not greater than 1200 fsec². This holds true for other laser materials. Where the dispersion amount is set to an absolute value greater than 1200 fsec², this is realized by providing a plurality of dispersion mirrors as in the embodiments shown in FIGS. 6 and 7 to be described later.

In the embodiment described above, the solid-state laser medium 15 is made of Yb:KYW, but the identical calculation results to those shown in FIGS. 3 and 5 are obtained for a Yb:KGW crystal with respect to the gain advantages of competitive pulses to the fundamental soliton pulse. The reason is that Yb:KYW and Yb:KGW have identical physical property constants, such as the fluorescence bandwidth, stimulated emission cross section, absorption cross section, and the like. They differ only in the value of nonlinear refraction index $n_2$, in which the value of the Yb:KGW ($n_2$=20×10⁻²⁰ m²/W) is 2.3 times as that of the Yb:KYW ($n_2$=8.7×10⁻²⁰ m²/W). Accordingly, the total intracavity dispersion amount needs to be increased by 2.3 times in comparison with the case in which Yb:KYW is used in terms of absolute value. That is, when the solid-state laser medium is Yb:KGW, the desirable range of the intractivity total dispersion amount D is from −5750 to less than 0 fsec².

In FIG. 1, the resonator length is assumed to be 50 mm, but when configuring a linear resonator like that shown in FIG. 1, both the stability of mode locking and the stability of laser resonator can be achieved if the resonator length is not greater than 200 mm.

As described above, a longer resonator length reduces the pulse repetitions and increases the pulse energy which exceeds the CW mode locking threshold easily. That is, if only Formula (2) above with respect to the CW mode locking is considered, it can be said that a greater pulse energy is preferable, and hence a longer resonator length is preferable.

On the other hand, viewing from the standpoint of instability of laser output due to mechanical variations, the resonator length can not be increased indefinitely. Generally, it is thought that about 200 mm is the mechanical limit, which is obtained from the following considerations.

Generally, in a mode-locked solid-state laser apparatus with a resonator length of about 1 m, it is often the case that the optical misalignment arising from mechanical vibration/drift, positional displacement by heat, deflection by rigidity, and the like causes deterioration and instability of the laser properties. It is known that the alignment allowance of the resonator is inversely proportional to the resonator length, and is a function of the mirror curvature. It is known that the alignment allowance in a 1 m class apparatus is about 50 to 100μ rad as described, for example, in the literature by N. Hodgson and H. Weber, Optical Resonators p. 219, Springer. Consequently, by reducing the resonator length to a value not greater than 200 mm, the allowance may be increased by five times from 250 to 500μ rad. Although the mechanical variations of the mirror can not be quantified easily but for a typical gimbal, it is 50μ rad (with a temperature variation of 8 degrees centigrade, catalog of Newport Corporation), which shows that a mirror variation comparable to the allowance occurs in an 1 m class resonator. If the resonator length is reduced to a value not greater than 200 mm, however, the mirror variation is reduced to about ⅕ of the allowance, and output power variation is reduced to a negligible level.

As described above, in consideration of not only the stability of mode locking but also the stability of the laser resonator, it is desirable that the resonator length is not greater than 200 mm for satisfying both of them.

Next, configurations of the laser resonator will be described further. As specific examples of the negative dispersion element 17 shown in FIG. 1, a prism pair of prisms 20, 21 as illustrated in an embodiment of FIG. 6 and a negative dispersion mirror pair of negative dispersion mirrors 30, 31 illustrated in an embodiment of FIG. 7 may be used. Of course, the negative dispersion element is not limited to these, and any element if it provides negative dispersion may be used, such as a negative dispersion fiber or a diffraction grating pair.

Figure 8:
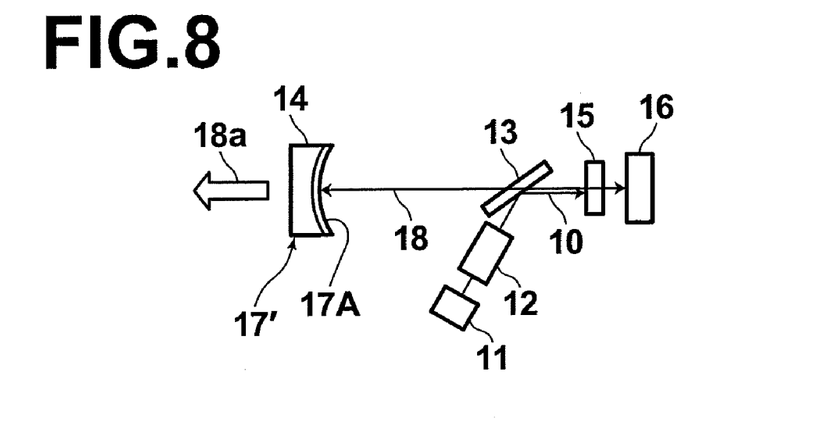
FIG. 8 is a schematic side view of a mode-locked solid-state laser apparatus according to still another embodiment of the present invention.

For example, the use of a prism pair of SF10 glass allows the resonator length to be reduced to a value not greater than 40 cm. The reason is that the spacing between the prisms can be set about 30 cm when the appropriate amount of negative dispersion is −2500 fsec², to be described later (Non-Patent Document 3). For negative mirrors, a chirp mirror which is a mirror having a dielectric multilayer film coated thereon that allows each wavelength to ingress to a different depth (literature, Laser Engineering, Vol. 27, No. 11, pp. 744-749) and a so-called GTI (Gires-Tournois Interferometer) mirror using an etalon interferometer (literature, IEEE, Transaction on Quantum Electronics, Vol. 22, No. 1 (1986) pp. 182-185), and the like are known. In the latter case, about −1000 fsec² per single reflection can be realized with a commercial product level GTI mirror, and use of two mirrors may provide a negative dispersion amount of as much as −4000 fsec² per round trip. In the present invention, the negative dispersion amount is defined in net round-trip amount considering the contribution of positive dispersion in the resonator (laser medium, ordinary mirror, SESAM). The use of the latter negative dispersion mirror is preferable in order to reduce the resonator length. In this case, the resonator length can be reduced to 50 cm or less. Further, in this case, as in an embodiment shown in FIG. 8, the output mirror 14 may double as a negative dispersion mirror 17' by applying a transmission type negative dispersion coating 17A to the mirror surface of the output mirror 14. In the former case, a chirp mirror with a reflectance ratio of 99.8% may be used as the negative dispersion mirror.

Figure 9:
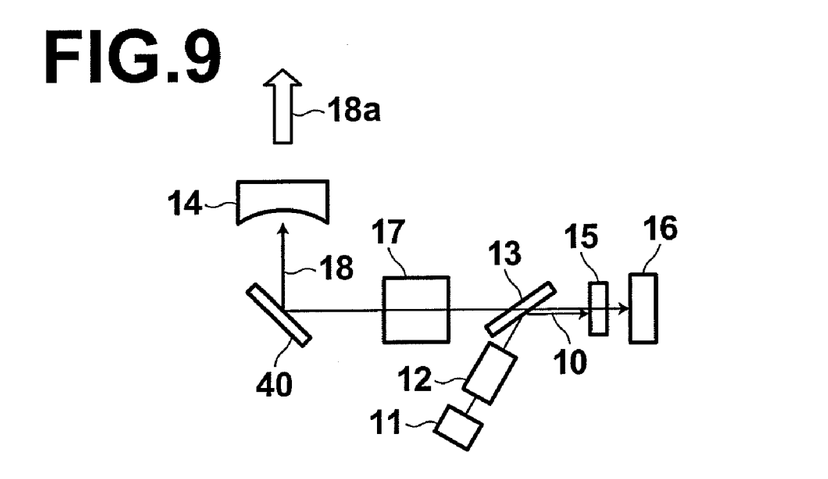
FIG. 9 is a schematic side view of a mode-locked solid-state laser apparatus according to still another embodiment of the present invention.
Figure 10:
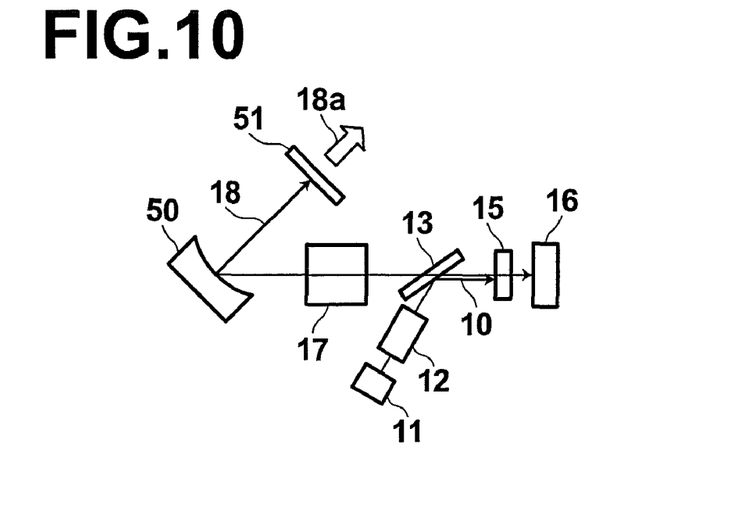
FIG. 10 is a schematic side view of a mode-locked solid-state laser apparatus according to still another embodiment of the present invention.

Preferably, the resonator configuration is a linear type, but not limited to this, and any configuration may be employed as long as the SESAM 16 and solid-state laser medium 15 are disposed in proximity to each other. For example, as in an embodiment shown in FIG. 9 or 10, an L-shaped or a V-shaped resonator configuration may be employed. In this way, various geometric layouts are possible. In FIG. 9, the reference numeral 40 denotes a planar mirror for reflecting oscillation light 18 and, in FIG. 10, the reference numeral 50 denotes a concave mirror for reflecting oscillation light 18 and the reference numeral 51 denotes an output mirror.

Note that, in an apparatus structured in L or V shape, both the stability of mode-locking and the stability of laser resonator can be achieved if the resonator length is not greater than 200 mm, as in the linear type.

Figure 11:
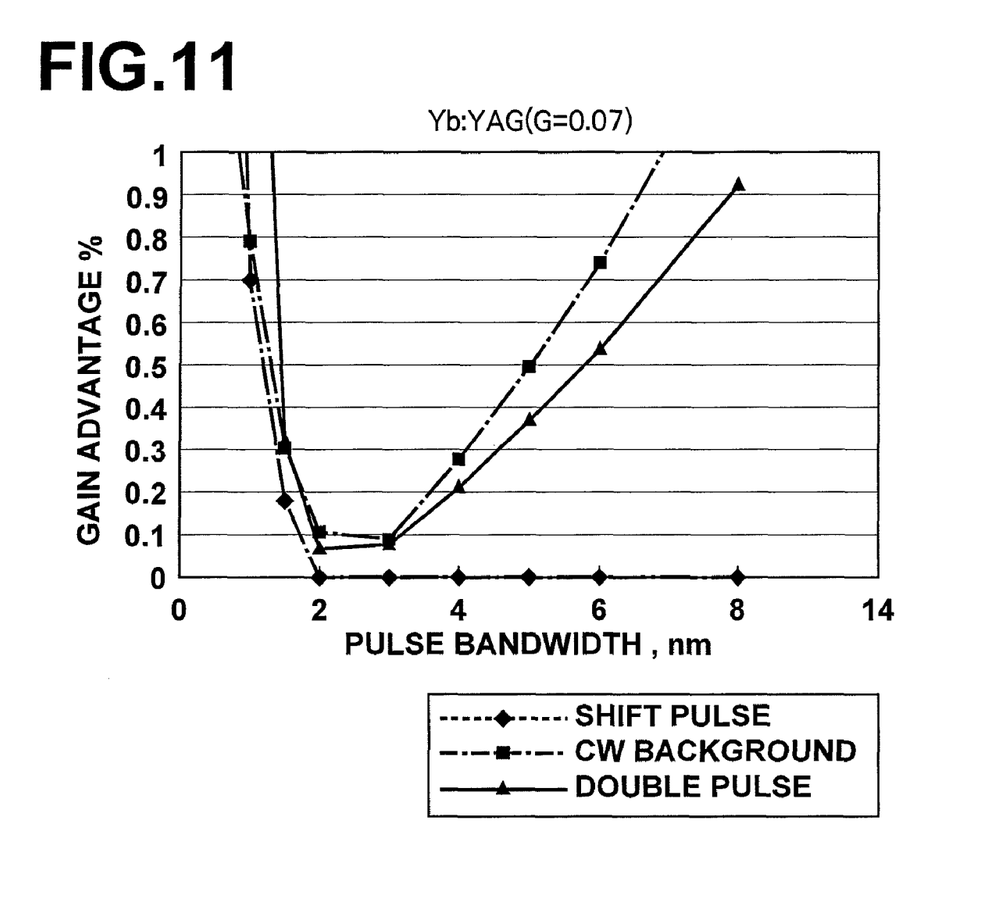
FIG. 11 is a graph illustrating, by way of an example, the relationship between pulse bandwidth and gain advantage in the mode-locked solid-state laser apparatus.

Calculation results of gain advantages of competitive pulses to the fundamental soliton pulse with respect to 1050 nm oscillation of Yb:YAG crystal, which is a typical short pulse material, are shown in FIG. 11. Here, as the gain G of the fundamental period soliton pulse, G=0.07 is assumed.

In this case also, it is known that a bandwidth in which soliton pulses are stably generated can be obtained by satisfying $\Delta R \geq 0.4\%$, when S=4. For example, the double pulse and CW background may be suppressed in the bandwidth from 2 to 4 nm by setting $\Delta R=0.8\%$. A further increase of $\Delta R$ allows the soliton pulses to be generated stably in a broader pulse bandwidth. In practice, it is preferable to realize soliton mode locking with a short pulse width of not greater than 300 fsec. Thus, as the pulse bandwidth, it is preferable to make it greater than 4 nm (corresponding to pulse width of 287 fsec). Accordingly, where Yb:YAG is used, it is preferable to satisfy $\Delta R \geq 0.8\%$ or greater. Yb:YAG has a nonlinear refraction index ($n_2=6.2\times10^{-20}$ $m^2/W$) which is about 70% of that of Yb:KYW, the maximum total intracavity dispersion amount (absolute value) is 70% of the maximum dispersion amount (absolute value) of Yb:KYW, which falls within the range from $-1750$ to less than 0 $fsec^2$.

As for the solid-state laser medium, it is customary to use a single crystal. Recently, in garnet group materials, such as YAG, ceramic state laser media have been produced, and the present invention may use such type of solid-state laser medium. Ceramics have optical characteristics which are comparable or superior to those of a single crystal and can be produced in large sizes, so that cost reductions can be expected. In addition to garnet, a group of so-called C-rare earths can be ceramitized, which include Yb:$Y_2O_3$, Yb:$Sc_2O_3$, Yb:$Lu_2O_3$, and the like (literature, Optics Express, Vol. 11, No. 22 (2003) pp. 2911-2916). Further those materials inherently allow production of large solid-state media at low cost, such as glass, have actually used as laser media. With Yb-doped glass and Er/Yb codoped glass (literature, Optics Letters, Vol. 30, No. 3 (2005) pp. 263-265), devices that make use of broadband emission characteristics inherent to glass are manufactured. The present invention is effective to those described above.

Figure 12:
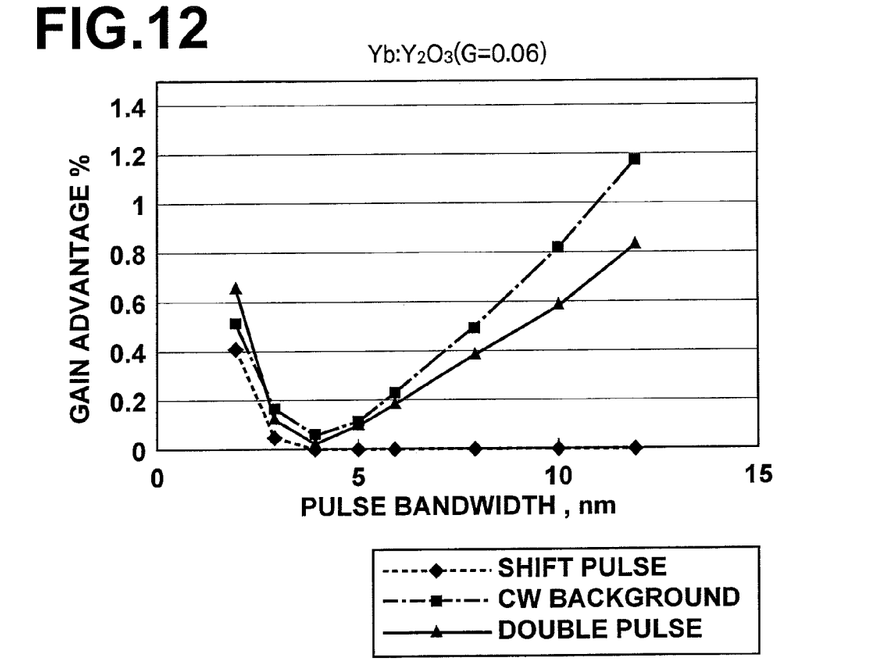
FIG. 12 is a graph illustrating, by way of an example, the relationship between pulse bandwidth and gain advantage in the mode-locked solid-state laser apparatus.

Calculation results of gain advantages of competitive pulses to the fundamental soliton pulse with respect to Yb:$Y_2O_3$ are shown in FIG. 12. Here, as the gain G of the fundamental period soliton pulse, G=0.06 is assumed.

In this case also, it is known that a bandwidth in which soliton pulses are stably generated can be obtained by satisfying $\Delta R \geq 0.4\%$, when S=4. For example, the double pulse and CW background may be suppressed in the bandwidth from 4 to 6 nm by setting $\Delta R=0.8\%$ and S=4. In this way, while the pulse bandwidth in which the double pulse and CW background can be suppressed is very narrow, only adjacent to 4 nm, when $\Delta R=0.4\%$, the competitive pulses can be suppressed in a broader pulse bandwidth by satisfying $\Delta R \geq 0.8\%$ or greater.

Yb:$Y_2O_3$ has a nonlinear refraction index ($n_2=1.16\times10^{-19}$ $m^2/W$) which is about 1.3 times that of Yb:KYW, so that the absolute value of dispersion amount D becomes also 1.3 times. Accordingly, the preferable range of the total intracavity dispersion amount D for Yb:$Y_2O_3$ is from $-3250$ to less than 0 $fsec^2$.

Further, identical calculations were performed for Yb:$Lu_2O_3$ and Yb:$Sc_2O_3$ having the same crystal structure.

Figure 13:
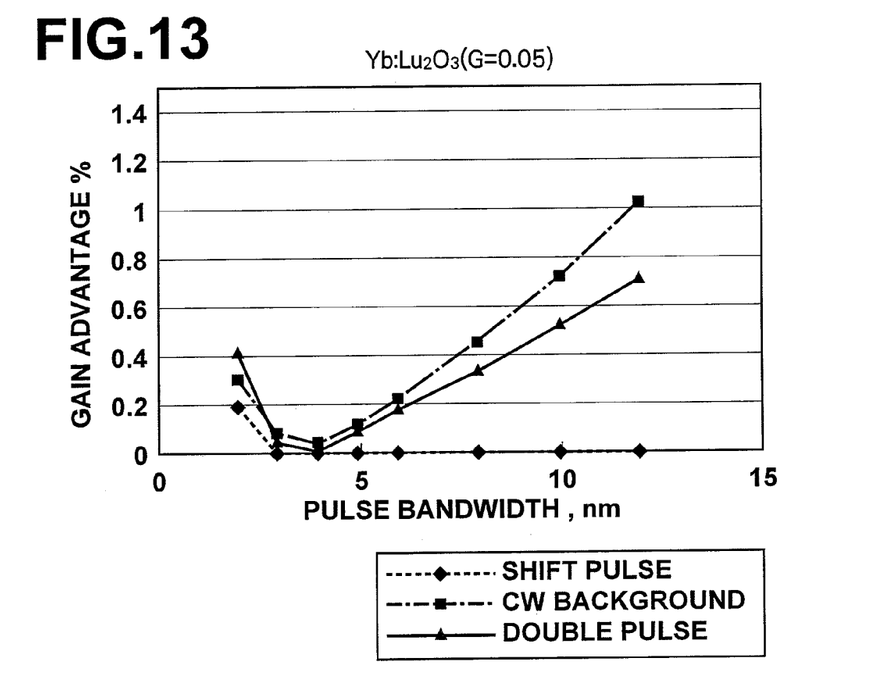
FIG. 13 is a graph illustrating, by way of an example, the relationship between pulse bandwidth and gain advantage in the mode-locked solid-state laser apparatus.

Next, calculation results for Yb:$Lu_2O_3$ are shown in FIG. 13. Here, as the gain G of the fundamental period soliton pulse, G=0.05 is assumed. In this case also, it is known that a bandwidth in which soliton pulses are stably generated can be obtained by satisfying $\Delta R \geq 0.4\%$, when S=4, and that the bandwidth can be broadened by increasing the $\Delta R$.

Yb:$Lu_2O_3$ has a nonlinear refraction index ($n_2=1.0\times10^{-19}$ $m^2/W$) which is about 1.2 times that of Yb:KYW, so that the absolute value of total intracavity dispersion amount D becomes also 1.2 times. Accordingly, the preferable range of the total intracavity dispersion amount D for Yb:$Y_2O_3$ is from $-3000$ to less than 0 $fsec^2$. Note that Yb:$Sc_2O_3$ has a crystal structure and a nonlinear refraction index identical to the crystal structure and nonlinear refraction index of Yb:$Lu_2O_3$ so that the identical condition to that of Yb:$Lu_2O_3$ is applied to Yb:$Sc_2O_3$.

Figure 14:
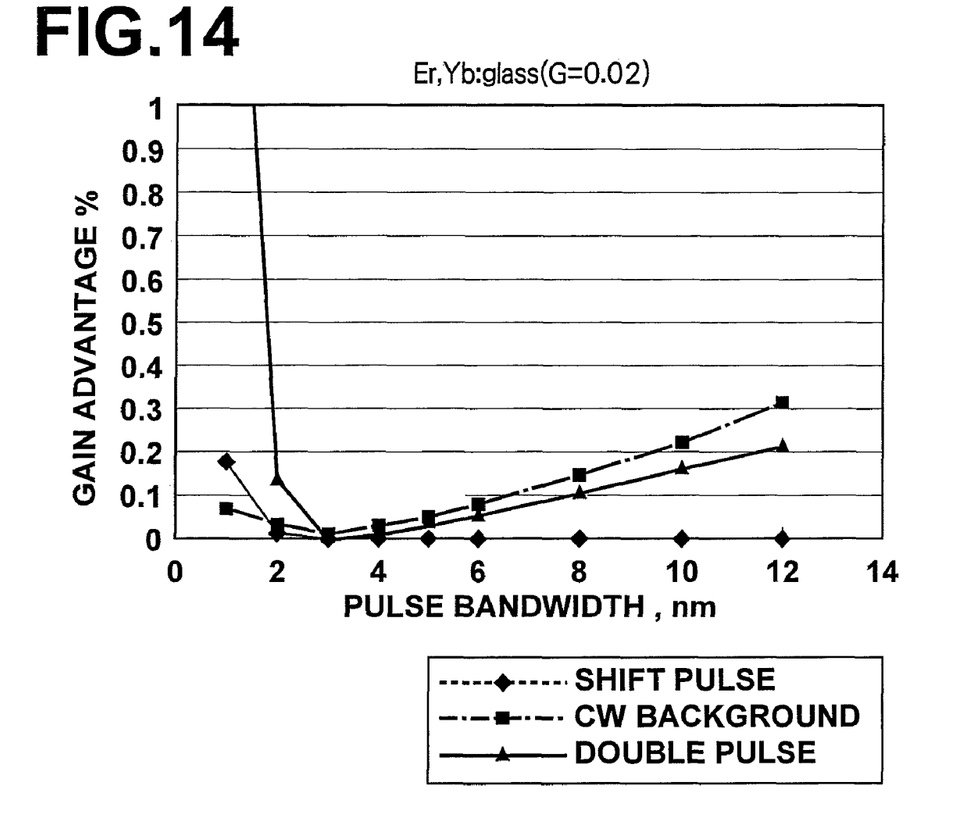
FIG. 14 is a graph illustrating, by way of an example, the relationship between pulse bandwidth and gain advantage in the mode-locked solid-state laser apparatus.

Next, calculation results of gain advantages of competitive pulses to the fundamental soliton pulse when Er/Yb codoped phosphate glass is used are shown in FIG. 14. Here, as the gain G of the fundamental period soliton pulse, G=0.02 is assumed.

Figure 15:
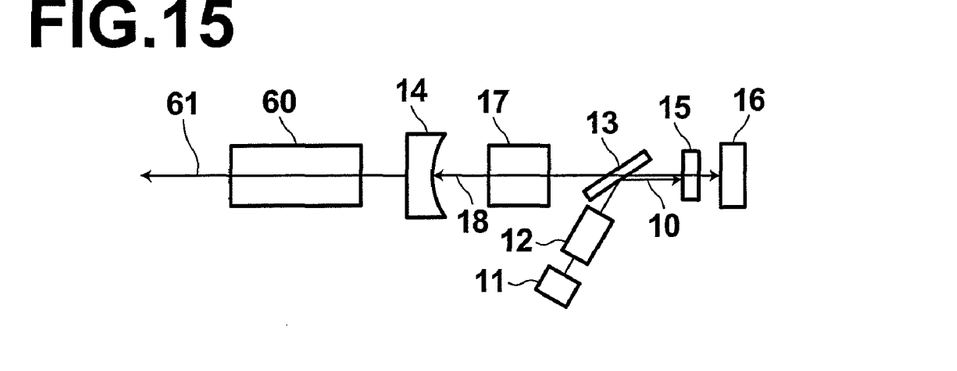
FIG. 15 is a schematic side view of a mode-locked solid-state laser apparatus according to a further embodiment of the present invention.

In the Er/Yb codoped phosphate glass, the excitation light is absorbed by Yb ions, and the energy is transferred to Er ions through energy transfer. Further, the use of the phosphate glass, which is a medium having relatively high phonon energy, will result in fast relaxation from excitation level $^4I_{11/2}$ to laser upper level $^4I_{13/2}$. This allows population inversion to be formed with high efficiency. In this case, the oscillation is near 1550 nm, and excitation is 980 nm.

Where Er/Yb codoped phosphate glass is used as the laser medium, as illustrated in FIG. 15, a configuration may be adopted in which the oscillation light 18 with a wavelength from 1550 to 1600 nm is passed through a nonlinear optical crystal 60 to generate a second harmonic 61, as well as outputted directly. In this case, the oscillation light can be converted to light with a wavelength in the range from 780 to 800 nm. Conventional solid-state lasers adjacent to 800 nm require a transition metal crystal, such as TiSapphire or the like, in addition to a 532 nm green laser as the excitation light source. But, the configuration described above allows semiconductor laser excitation in the infrared wavelength region, which provides a benefit that an inherently high efficient rare earth transition can be used.

In the case of Er/Yb codoped phosphate glass, the shift pulse becomes approximately 0 at 2 nm pulse bandwidth. In practice, it is preferable to realize soliton mode locking with a pulse width not greater than 600 fsec, and hence it is preferable that the pulse bandwidth is set to a value not less than 4 nm (corresponding to 600 fsec pulse width).

Further, Er/Yb codoped phosphate glass has a small non-linear refraction index ($n_2=3\times10^{-20}$ m$^2$/W), so that the dispersion amount can also be small and the preferable range of the total intracavity dispersion amount is from −1200 to less than 0 fsec$^2$.

Figure 16:
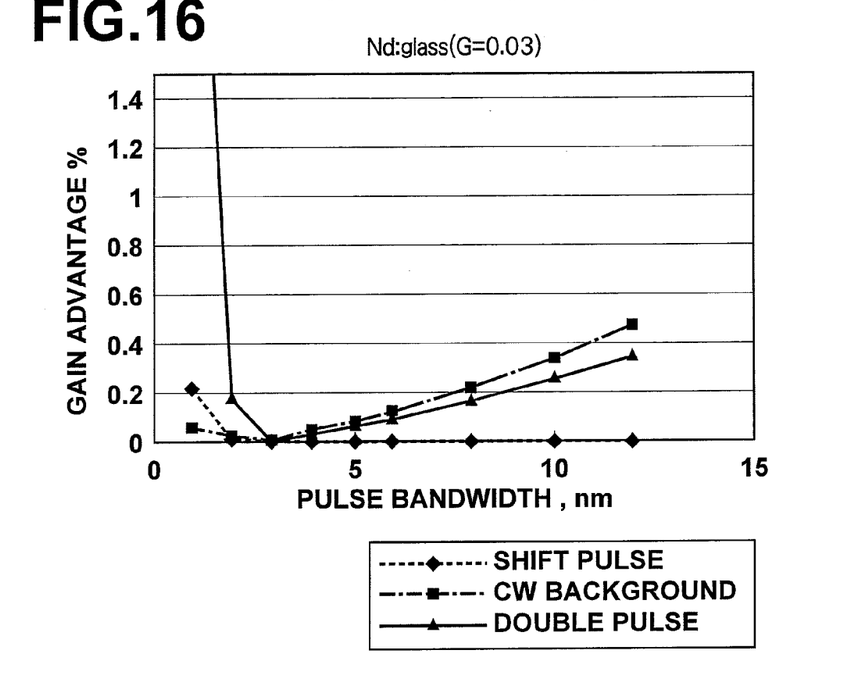
FIG. 16 is a graph illustrating, by way of an example, the relationship between pulse bandwidth and gain advantage in the mode-locked solid-state laser apparatus.

The same holds for a laser glass material doped with Nd. Calculation results of gain advantages of competitive pulses to the fundamental soliton pulse with respect to phosphate laser glass doped with, for example, Nd are shown in FIG. 16.

In this case also, it is preferable that the pulse bandwidth is set to a value not less than 4 nm by the same discussion as above. The phosphate glass doped with Nd has a nonlinear refraction index $n_2=6.2\times10^{-20}$ m$^2$/W, which is about ⅓ of that of Yb:KYW, so that the dispersion amount D becomes also ⅓, and the preferable range of the total intracavity dispersion amount is from −800 to less than 0 fsec$^2$.

In the exemplary embodiments above, conditions of achieving soliton mode locking have been described in detail. Where the restrictions described above are not placed on the dispersion amount D, the fundamental mode-locked laser is not generated in the mode-locked solid-state laser apparatus of the present invention and, instead, double pulse or Q-switching may occur. On another front, double pulse or Q-switched pulse is desirable to certain applications. For example, although in the nanosecond region, in metal working by laser or the like, a scheme of improving laser processing efficiency is reported in which the first pulse arrives at a processing target object to cause laser ablation, and then the second pulse arrives to heat the plasma generated by the laser ablation. The double pulse may be used for such applications. Further, the Q-switched pulse laser which has high peak power of mode locking coupled with high energy of Q-switched pulse may be preferably used for laser processing.

More specifically, in a solid-state laser apparatus having the configuration described above, when the negative dispersion amount was extremely increased (−3000 to −5000 fsec$^2$), a waveform in which Q-switched pulses or double pulses are superimposed on the fundamental period mode locking was observed as the output light. In the case of Q-switched operation, the average power is about the same as that of the fundamental period mode locking state, and a mode-locked pulse train is disposed in a long pulse of several microseconds (Q-switched pulse) at a repetition rate of several kilohertz to several hundred kilohertz. Even such a waveform may preferably be used for energy applications, such as the laser processing and the like, through energy amplification.

What is claimed is:

1. A mode-locked solid-state laser apparatus, comprising:
an output mirror that forms a first end of a resonator; a saturable absorption mirror that forms a second end of the resonator;
a solid-state laser medium disposed at a position inside of the resonator where the distance from the saturable absorption mirror is not greater than twice a Rayleigh length;
an excitation optical system that inputs excitation light from outside into the resonator;
a negative group velocity dispersion element, disposed inside of the resonator, that causes group velocity dispersion of the entire resonator to be not greater than 0 when light makes one round trip in the resonator;
a dichroic mirror, disposed inside of the resonator, that reflects the excitation light inputted from outside into the resonator by the excitation optical system toward the solid-state laser medium and transmits oscillation light;
wherein the negative group velocity dispersion element is either one of a prism pair, a diffraction grating pair, and a negative dispersion mirror pair or a combination of two or more of them; and
the negative group velocity dispersion element is physically separated from the output mirror of the resonator, the solid state laser medium and saturable absorption mirror are disposed in close proximity to each other at a distance not greater than twice a Rayleigh length, wherein said Rayleigh length is obtained on the basis of beam waist diameter at the saturable absorption the saturable absorption mirror has an absorption modulation depth OR not less than 0.4%; and
the absolute value |D| of a total intracavity linear dispersion amount D when light having a predetermined wavelength makes one round trip in the resonator, which is represented by the following relational expression, is set within a range of minimum value 0 to maximum value which is calculated from pulse bandwidth $\Delta\lambda_p$, in which $\Delta G(CW)<\Delta R/2$ and $\Delta G(DP) \leq \Delta R/S$ are satisfied (where, $\Delta G(CW)$ is the gain advantage of the CW background with respect to the fundamental soliton pulse, $\Delta G(DP)$ is the gain advantage of the double pulse with respect to the fundamental soliton pulse in the resonator, and S is the saturation level of the saturable absorption mirror), $|D|=((1.76A_{effL}c\Delta\lambda_p)/(4\pi n_2 I_s*0.315\lambda_0 E_p)$ (where c is the velocity of light, $\lambda_0$ is the center wavelength, $A_{effL}$ ($=\pi\Omega_L^2$) is the oscillation light beam cross section at the laser medium, $n_2$ is the nonlinear refraction index $I_s$ is the crystal length of the laser medium, and $E_p$ is the intracavity pulse energy).

2. The mode-locked solid-state laser apparatus as claimed in claim 1, wherein, in the resonator, the negative group velocity dispersion element, dichroic mirror, and solid-state laser medium are disposed in this order from the output mirror side.

3. The mode-locked solid-state laser apparatus as claimed in claim 1, wherein the solid-state laser medium comprises a rare earth doped base material.

4. The mode-locked solid-state laser apparatus as claimed in claim 3, wherein the rare earth is ytterbium (Yb), erbium (Er), or neodymium (Nd).

5. The mode-locked solid-state laser apparatus as claimed in claim 3, wherein the solid-state laser medium is one of Yb:YAG ($Y_3Al_5O_{12}$), Yb:KYW (K($WO_4$)$_2$), Yb:KGW (KGd($WO_4$)$_2$), Yb:$Y_2O_3$, Yb:$Sc_2O_3$, Yb:$Lu_2O_3$, Er, Yb:glass, and Nd:glass.

6. The mode-locked solid-state laser apparatus as claimed in claim 1, wherein the resonator is a linear type resonator.

7. The mode-locked solid-state laser apparatus as claimed in claim 1, wherein the diameter of the laser oscillation light is not greater than 100 μm at the solid-state laser medium.

8. The mode-locked solid-state laser apparatus as claimed in claim 1, wherein the negative group velocity dispersion element is either one of a prism pair, a diffraction grating pair, and a negative dispersion mirror pair or a combination of two or more of them.

* * * * *